United States Patent
Palvolgyi

[19]

[11] Patent Number: 5,988,238

[45] Date of Patent: Nov. 23, 1999

[54] CLOSURE DEVICE FOR A VEHICLE TANK FILLER NECK

[75] Inventor: Sandor Palvolgyi, Gleisdorf, Austria

[73] Assignee: Blau International GesmbH, Preding, Austria

[21] Appl. No.: 08/875,169

[22] PCT Filed: Nov. 21, 1996

[86] PCT No.: PCT/AT96/00233

§ 371 Date: Jan. 27, 1998

§ 102(e) Date: Jan. 27, 1998

[87] PCT Pub. No.: WO97/18968

PCT Pub. Date: May 29, 1997

[30] Foreign Application Priority Data

Nov. 21, 1995 [AT] Austria ................................. 1896/95
Aug. 26, 1996 [AT] Austria ................................. 1520/96

[51] Int. Cl.[6] ................................................. B65D 51/18
[52] U.S. Cl. ............... 141/312; 220/86.2; 220/DIG. 33; 296/97.22; 280/834
[58] Field of Search ................ 141/312; 220/86.1–86.3; 280/834, 835; 296/97.22

[56] References Cited

U.S. PATENT DOCUMENTS

| | | | |
|---|---|---|---|
| 1,995,960 | 3/1935 | Boyd | 220/86.3 |
| 2,035,895 | 3/1936 | Kelly | 220/86.2 |
| 2,054,145 | 9/1936 | Tandy | 280/834 |
| 2,151,249 | 3/1939 | Vidmar | 280/834 |
| 2,294,190 | 8/1942 | Lee | 220/86.2 |
| 2,469,283 | 5/1949 | Steele | 280/834 |
| 2,574,836 | 11/1951 | Marcell | 220/DIG. 33 |
| 3,133,741 | 5/1964 | Garabello | 220/86.2 |
| 3,374,007 | 3/1968 | Ingolia | 296/97.22 |
| 5,145,081 | 9/1992 | Gravino | 220/86.2 |
| 5,533,766 | 7/1996 | Farber | 296/97.22 |

FOREIGN PATENT DOCUMENTS

| | | |
|---|---|---|
| 010 005 | 4/1980 | European Pat. Off. . |
| 342 679 | 11/1989 | European Pat. Off. . |
| 2 538 785 | 7/1984 | France . |

*Primary Examiner*—J. Casimer Jacyna
*Attorney, Agent, or Firm*—Pillsbury Madison & Sutro LLP

[57] ABSTRACT

A closure device for a vehicle tank filler neck, which has a shut-off valve (21) provided with an actuating device (22) and which terminates in a recessed area (8) of the vehicle body (9), which can be covered by means of a body flap (10), wherein the body flap (10) has a drive device (23) which is controlled by the actuating device (22) via a unidirectional control path.

18 Claims, 4 Drawing Sheets

Fig.3

CLOSURE DEVICE FOR A VEHICLE TANK FILLER NECK

This application is the national phase of international application PCT/AT96/00233, filed Nov. 21, 1996 which designated the U.S.

FIELD OF THE INVENTION

The instant invention relates to a closure device for a vehicle tank filler neck, which has a shut-off valve provided with an actuating device and which terminates in a recessed area of the vehicle body, which can be covered by means of a body flap, wherein the body flap has a drive device which is controlled by the actuating device.

BACKGROUND OF THE INVENTION

Such a closure device is known from EP 0 342 679, and has a mechanical coupling acting in both directions between the shut-off valve and the body flap, i.e. it is possible to control the movement of the body flap by actuating the valve, for example from the interior of the vehicle, as well as to control the valve actuation by moving the body flap. This manner of functioning is very dangerous in case of a crash. The deceleration and thrust forces occurring in a crash can cause the unintended opening of the vehicle flap, through which the filler neck valve is also opened, so that highly flammable fuel can come out.

OBJECT AND SUMMARY OF THE INVENTION

It is the object of the invention to create a closure device of the type mentioned in the introduction which offers increased crash security. In accordance with the invention this object is attained in that the drive device for the body flap is locked in the closed position of the shut-off valve and can be unlocked by the actuating device of the shut-off valve.

The closure device in accordance with the invention does not constitute any safety risk in case of a crash. In the locked position of the shut-off valve the control path from the body flap to the shut-off valve is blocked, so that the unintentional opening of the shut-off valve by exterior actions on the body flap is impossible.

A preferred embodiment of the invention is distinguished in that the actuating device can be controlled by means of a switch located within the reach of the driver's seat or by remote control, which represents a pleasant improvement of the ease of operation for the user.

The drive device preferably is a servo motor, which is triggered electrically, hydraulically or pneumatically by the actuating device. This simplifies triggering by the actuating device, but does not require an increased outlay on the part of the drive device.

An alternative which is particularly advantageous from the viewpoint of manufacturing technology consists in that the drive device is a gear which is mechanically coupled with the actuating device, wherein the actuating device is locked in the closed position of the shut-off valve. The shu-toff valve is closed by means of the mechanical coupling when the vehicle flap is manually closed, while locking in the closed position prevents manual opening. In this case the locking of the actuating device in the rest position assures the unidirectionality of the triggering path from the actuating device to the drive device.

In connection with the last mentioned embodiment it is particularly advantageous for increasing the crash security, if the gear has a predetermined breaking point, a connection which breaks under excessive stress, or the like. A particularly preferred construction is distinguished in that the connection comprises a thrust guide on the one hand and a sliding head guided therein on the other hand, wherein at least one of the components consisting of thrust guide and sliding head is provided with teeth, which the other part engages with a corresponding projection, wherein the teeth and/or the projection are flexibly, preferably elastically seated. In a preferred manner a deflecting guide is attached to at least one end of the thrust guide, which deflects the sliding head out of the thrust axis direction, so that excessive forces in the thrust axis direction result in a severance of the connection at the end of the thrust guide.

In each case the ease of operation and the safety of the closure device can be further increased if, in accordance with a further feature of the invention, the actuating device for closing the shut-off valve can be controlled by the ignition circuit of the vehicle, wherein switching the ignition circuit on causes the closing of the shut-off valve and thus of the body flap. It can be assured in this way that the shut-off valve and the body flap controlled by it are always closed when the vehicle is placed into operation. Further than that, this attainment provides an increased ease of operation for the driver, because the closing or the checking of the closed position of the closure device can be omitted.

The invention will be explained in more detail below by means of an exemplary embodiment represented in the drawings.

BRIEF DESCRIPTION OF THE DRAWINGS

FIG. 3 represents a schematic longitudinal section through the closure device at the level of the drive device in accordance with the operating position in FIG. 2.

DETAILED DESCRIPTION OF THE PREFERRED EMBODIMENT

Figure 1:
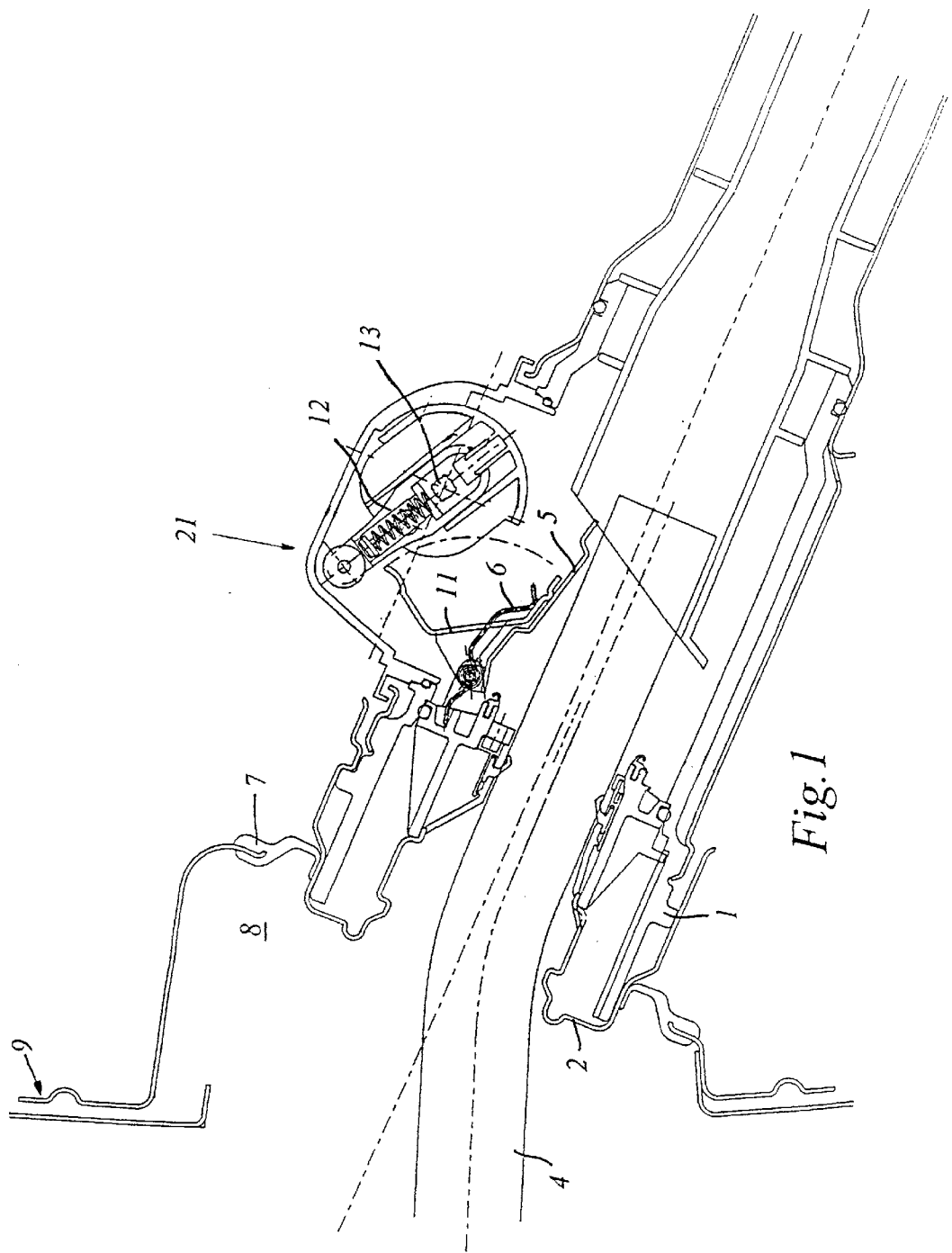
FIGS. 1 and 2 represent a schematic longitudinal section through the closure device at the level of the shut-off valve in two different operating positions.

The upper end of a filler neck 1 is represented in FIGS. 1 to 4, whose lower end (not represented) leads to a vehicle fuel tank. An approximately cup-shaped insert 2 has been sealingly seated in the upper end of the filler neck 1, which on its lower end has an opening 3 of decreased diameter for the entry of the filling tube 4 of a fuel pump nozzle (not shown in further detail). The opening 3 can be closed by means of a flap 5, hinged on one side and prestressed against the lower edge of the opening by a spring 6.

Figure 3:
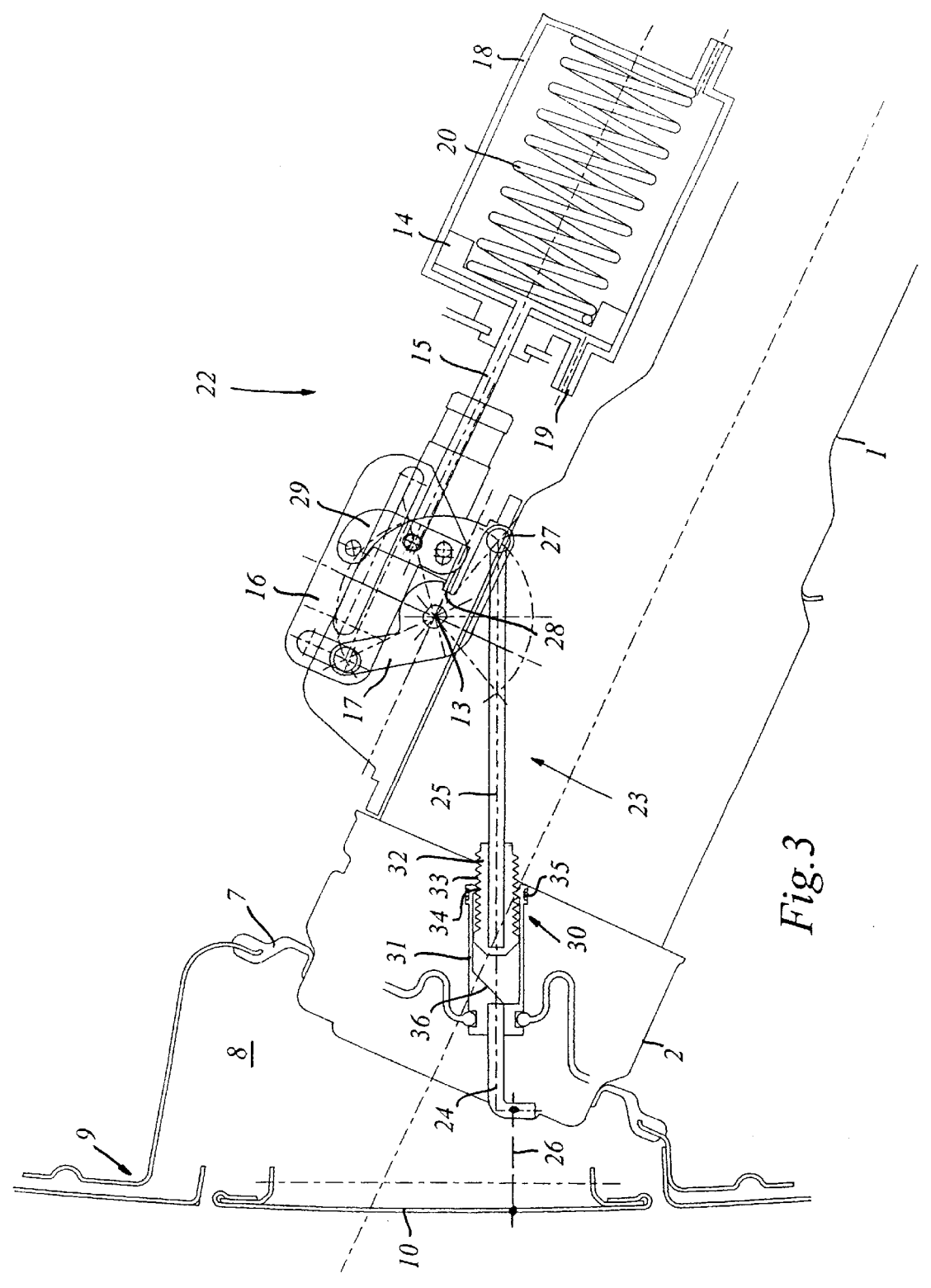

The upper end of the filler neck 1, together with the insert 2, and with the interposition of a sealing sleeve 7, projects through an opening 8 in a recessed area of a vehicle body 9. The recessed area is covered by means of a body flap 10 hinged on the vehicle body 10 (FIG. 3).

Figure 2:
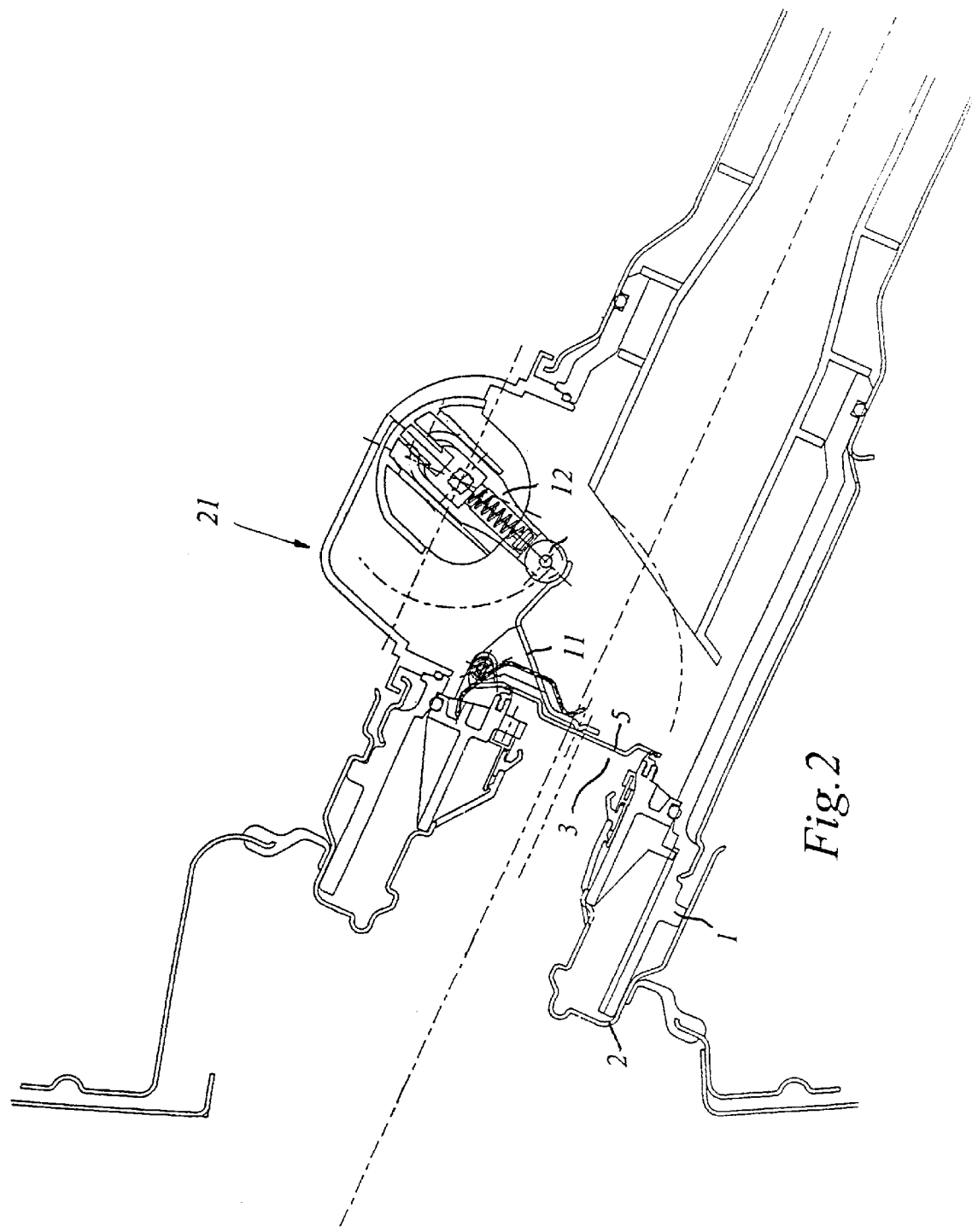

For the tight closing of the opening 3 during vehicle operation, a contact pressure finger 11 is hinged next to the flap 5, which can act on the underside of the flap 5 with the aid of a pivotable cam 12, which is provided with a spring-loaded pressure roller on its end (FIG. 2). Pivoting of the cam 12 is accomplished via a shaft 13 which is driven by a pneumatic piston 14 via a piston rod 15, a connecting link 16 fastened thereon and a lever 17 taken along by the latter (FIG. 3). The piston 14 can be acted upon in a cylinder 18 by compressed air via a pressure line 19 and works against a pressure spring 20.

In this way the opening 3, the flap 5, the contact pressure finger 11 and the cam 12 form a shut-off valve, identified in general by 21, for the filler neck 1, which is actuated via the shaft 13 by an actuating device, identified in general by 22 and having the elements 14 to 20. It is of course understood that in place of the shut-off valve 21 shown and the actuating device 22 shown any other type of shut-off valve or valve actuating device can be used, something which is known to one skilled in the art.

The actuating device 22 furthermore controls the movement of the body flap 10. The body flap 10 can be provided with a servo motor as the drive device, which is triggered, for example, in an electrical, hydraulic or pneumatic manner by the actuating device 22 in such a way that the body flap 10 is opened and closed simultaneously with the opening or closing of the shut-off valve 21.

A mechanical alternative of a drive device, identified in general by 23, for the body flap 10 is represented in FIG. 3. The drive device 23 includes a two-piece push rod 24, 25, which extends through the sealing sleeve 7 and is hinged at the one end on the body flap 10 (schematically indicated by the connection 26) and at the other end on the lever 17 by means of a ball joint 27.

The drive device 23 is locked in its rest position to prevent that the opening of the body flap 10 reacts with the actuating device 22 and opens the shut-off valve 21 through it.

A ratchet 29 taken along by the connecting link 16 engages a detent recess 28 of the lever 17. The piston rod 15 for its part acts on the ratchet 29. Therefore the retraction of the piston rod 15 first releases the ratchet 29 from the lever 17 and only thereafter moves the connecting link 16 and the lever 17. The ratchet 29 is prestressed by means of a spring (not represented) in the locked position shown in FIG. 3 and again engages the detent recess 28 of the lever 17 during the return movement of the piston rod 15.

The two elements 24, 25 of the push rod 24, 25 are connected with each other by a connection 30, which is disengaged when excessively stressed. The connection 30 is composed of a sleeve-shaped thrust guide 31 on the push rod element 24 and a sliding head 32 on the push rod element 25. The sliding head 32 is provided with an exterior thread 33 and the thrust guide 31 with a projection on the interior circumference, which engages the thread 33. The thrust guide 31 furthermore is slitted in the axial direction at several places distributed over its circumference and is surrounded by a tension spring 35. In case of an excessive axial force, the thrust guide 31 is opened against the force of the tension spring 35 and the projection 34 slides off the teeth of the thread 33. A deflection guide 36 in the form of an inclined face is disposed at the end of the thrust guide 31, on which the sliding head 32 runs up. The deflection guide 36 deflects the sliding head 32 out of the thrust axis direction, so that the connection 30 breaks open.

Alternatively or in addition to the connection 30 it is also possible to provide a simple predetermined breaking point.

In place of the thrust gear shown it is possible to employ any other arbitrary electric, pneumatic or hydraulic servo motor or also any other type of a mechanical gear as the drive device 23 for the body flap 10, as long as the unidirectionality of the control path from the actuating device 22 to the body flap 10 is assured.

Figure 4:
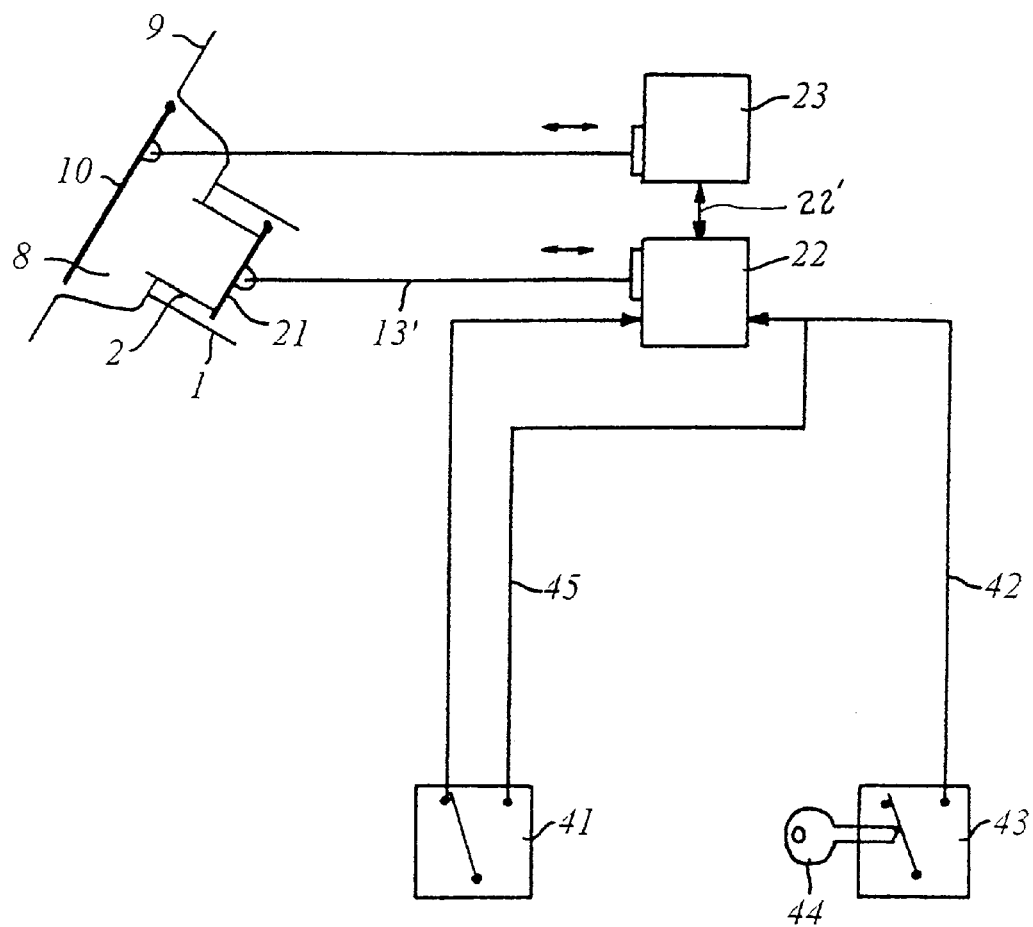
FIG. 4 is a block circuit diagram of the device.

FIG. 4 represents the generalized block circuit diagram of the device of FIGS. 1 to 3.

The opening and closing of the shut-off valve 21 is generally caused via a mechanical connection 13' by the actuating device 22, which can be constituted by an electrical, hydraulic or pneumatic servo motor or the like. Simultaneously with the actuation of the shut-off valve 21, the actuating device 22 triggers the drive device 23 for moving the body flap 10. In the embodiment represented in FIGS. 1 to 3 the drive device 23 is a mechanical coupling member, whose described locking assures the unidirectionality of the control path as indicated by reference numeral 22' in FIG. 4, from the actuating device 22 to the drive device 23.

The actuating device 22 can be controlled in both the closing and the opening position of the shut-off valve 21 and the body flap 10 by means of a switch 41 arranged within the reach of the driver's seat of the vehicle. An additional control path 42 for the closing direction is connected to the ignition circuit 43 of the vehicle. The actuation of the ignition key 44 of the vehicle or a similar actuating element causes the closing of the shut-off valve 21 and with it also of the body flap 10 via the control path 42 and the actuating device 22.

In the simplest case it can be provided that the switch 41 is exclusively used for opening the shut-off device, i.e. the signal path 45 can be omitted.

What is claimed is:

1. A closure device for a vehicle tank filler neck, which has a shut-off valve provided with an actuating device and which terminates in a recessed area of the vehicle body, which can be covered by means of a body flap, wherein the body flap has a drive device which is controlled by the actuating device, wherein when the drive device for the body flap is locked in the closed position of the shut-off valve, the drive device can be unlocked by the actuating device of the shut-off valve, wherein the drive device is a gear which is mechanically coupled with the actuating device, wherein the actuating device is locked in the closed position of the shut-off valve, and wherein the gear has one of a predetermined breaking point and a connection which is released under excessive stress.

2. The closure device in accordance with claim 1, characterized in that the actuating device is controlled by means of a switch disposed within the reach of the driver's seat.

3. The closure device in accordance with claim 1, characterized in that the drive device is a servo motor, which is triggered by the actuating device over one of an electrical, hydraulic, or pneumatic control path.

4. The closure device in accordance with claim 1, characterized in that the connection comprises a thrust guide on the one hand and a sliding head guided therein on the other hand, wherein at least one of the components consisting of the thrust guide and sliding head is provided with teeth, which the other part engages with a corresponding projection, wherein at least one of the teeth and the projection are flexibly seated.

5. The closure device in accordance with claim 4, characterized in that a deflecting guide is attached to at least one end of the thrust guide, which deflects the sliding head out of the thrust axis direction.

6. The closure device in accordance with claim 1, characterized in that for closing the shut-off valve, the actuating device can be controlled from the ignition circuit of the vehicle, wherein the switching on of the ignition circuit causes the closing of the shut-off valve and therefore also of the body flap.

7. The closure device in accordance with claim 1, characterized in that the actuating device has a pneumatic piston.

8. The closure device according to claim 1, wherein the actuating device is controlled by a remote control.

9. A closure device for a vehicle tank filter neck, comprising:
- a shut-off valve constructed and arranged to be disposed in the filler neck;
- an outer body flap movable between an opened position permitting access to the filler neck; and a closed position preventing access to the filler neck,
- a drive device operatively coupled with the outer body flap and being actuatable to move said outer body flap between said opened and closed positions,
- an actuating device operatively coupled with said shut-off valve to control opening and closing of said shut-off valve,
- said actuating device undirectionally coupled to said drive device so as to 1) enable said actuating device to actuate said drive device, and 2) prevent opening of the shut-off valve in response to opening of the outer body flap.

10. The closure device in accordance with claim 9, characterized in that the actuating device is controlled by means of a switch disposed within the reach of the driver's seat.

11. The closure device in accordance with claim 9, characterized in that the drive device is a servo motor, which is triggered by the actuating device over one of an electrical, hydraulic, or pneumatic control path.

12. The closure device in accordance with claim 9, characterized in that the drive device is a gear which is mechanically coupled with the actuating device, wherein the actuating device is locked in the closed position of the shut-off valve.

13. The closure device in accordance with claim 12, characterized in that the gear has one of a predetermined breaking point and a connection which is released under excessive stress.

14. The closure device in accordance with claim 13, characterized in that the connection comprises a thrust guide on the one hand and a sliding head guided therein on the other hand, wherein at least one of the components consisting of the thrust guide and sliding head is provided with teeth, which the other part engages with a corresponding projection, wherein the teeth and/or the projection are flexibly seated.

15. The closure device in accordance with claim 14, characterized in that a deflecting guide is attached to at least one end of the thrust guide, which deflects the sliding head out of the thrust axis direction.

16. The closure device in accordance with claim 9, characterized in that for closing the shut-off valve, the actuating device can be controlled from the ignition circuit of the vehicle, wherein the switching on of the ignition circuit causes the closing of the shut-off valve and therefore also of the body flap.

17. The closure device in accordance with claim 9, characterized in that the actuating device has a pneumatic piston.

18. The closure device in accordance with claim 9, characterized in that the actuating device is controlled by a remote control.

* * * * *